United States Patent
Agarwal et al.

(10) Patent No.: US 6,894,990 B1
(45) Date of Patent: May 17, 2005

(54) IP MULTICASTING IN MESH TDMA SATELLITE NETWORKS

(75) Inventors: Anil K. Agarwal, Gaithersburg, MD (US); Ashok K. Rao, Potomac, MD (US); Steven P. Rempe, Frederick, MD (US); Sreenivas Ramaswamy, Bethesda, MD (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 09/689,738

(22) Filed: Oct. 13, 2000

(51) Int. Cl.[7] .......................... H04B 7/212; H04L 12/28
(52) U.S. Cl. ................. 370/321; 370/390; 370/432
(58) Field of Search ..................... 370/321, 337, 370/347, 340, 392, 432, 316, 322, 326, 328, 329, 336, 341, 349, 389, 390, 477, 498, 408, 238; 455/427, 428, 430, 445, 560, 518; 709/249

(56) References Cited

U.S. PATENT DOCUMENTS

| | | | | | |
|---|---|---|---|---|---|
| 4,905,235 | A | * | 2/1990 | Saburi ........................ | 370/318 |
| 5,331,637 | A | * | 7/1994 | Francis et al. .............. | 370/408 |
| 5,812,545 | A | * | 9/1998 | Liebowitz et al. .......... | 370/337 |
| 5,898,686 | A | * | 4/1999 | Virgile ....................... | 370/432 |
| 6,101,180 | A | * | 8/2000 | Donahue et al. ............ | 370/352 |
| 6,298,058 | B1 | * | 10/2001 | Maher et al. ............... | 370/390 |
| 6,370,127 | B1 | * | 4/2002 | Daraiseh et al. ............ | 370/318 |
| 6,370,143 | B1 | * | 4/2002 | Yamagishi .................. | 370/390 |
| 6,377,561 | B1 | * | 4/2002 | Black et al. ................ | 370/330 |
| 6,523,069 | B1 | * | 2/2003 | Luczycki et al. ........... | 709/249 |
| 6,539,000 | B1 | * | 3/2003 | Murai et al. ................ | 370/260 |
| 6,539,003 | B1 | * | 3/2003 | Agarwal et al. ............ | 370/324 |
| 6,647,020 | B1 | * | 11/2003 | Maher et al. ............... | 370/432 |

* cited by examiner

Primary Examiner—Chau Nguyen
Assistant Examiner—Andy Lee
(74) Attorney, Agent, or Firm—Sughrue Mion, PLLC

(57) ABSTRACT

A system and method for supporting Internet Protocol (IP) Multicast in mesh TDMA satellite networks using a centralized route server architecture, which conserves link bandwidth and minimizes delay. Individual satellite terminals perform forwarding of multicast IP traffic to destination terminals based on information provided by the route-server. Multicast routing protocols need to be supported only at the route server, thus minimizing the CPU and memory resources required at the end terminals. Channel capacity for multicast traffic can be statically or dynamically assigned and takes full advantage of the broadcast nature of the medium.

16 Claims, 5 Drawing Sheets

IP MULTICASTING IN MESH TDMA SATELLITE NETWORKS

BACKGROUND OF THE INVENTION

1. Field of the Invention

Mesh satellite networks can be used to interconnect sites with traffic destined for several locations. These networks offer single-satellite-hop connectivity, in contrast to hub/spoke type networks, where all traffic is first sent to a hub and then re-distributed to the destination. Time Division Multiple Access (TDMA), Single Channel Per Carrier (SCPC)-Demand Assigned Multiple Access (DAMA), and Code Division Multiple Access (CDMA) schemes are commonly used for mesh networks.

2. Description of the Related Art

Commonly owned and assigned co-pending application Ser. No. 09/332,971, the contents of which are hereby incorporated herein by reference, has shown how IP services can be offered very efficiently over mesh networks using a centralized route server. This invention discusses the offering of multicast IP services over mesh satellite TDMA networks using the route server model described in the above-referenced application.

IP Multicast refers to the sending of an IP packet to multiple recipients, unlike the unicast case where a packet has a single source and a single destination. Multimedia applications such as audio/video streaming and video conferencing, business applications such as data distribution, software distribution, and Internet infrastructure applications such as web-replication can benefit greatly from multicast. Consequently, there has been a rapid increase in the deployment of multicast services in Intranets and the Internet.

The key concept in IP multicast is the building of a distribution tree which conveys packets from a source to all the interested recipients (the multicast group). In order to conserve network bandwidth, the tree should link only those receivers which are part of that multicast group. Many IP Multicast protocols exist which differ essentially in the way the distribution trees are created and shared.

The Distance Vector Multicast Routing Protocol (DVMRP), one of the oldest multicast routing protocols, belongs to the category of broadcast-and-prune protocols where the multicast data itself is used to build the tree. The DVMRP protocol assumes that all routers in a network want to receive all multicast packets. Packets are usually flooded to all routers, and those routers that do not want to receive multicast transmissions belonging to a particular group must send an explicit Prune message to their upstream routers to indicate this. DVMRP creates a (source, group) pair at every router. A shortest-path tree is created for every source of every group, to connect that source with all the other members of the group.

Protocol Independent Multicast-Sparse Mode (PIM-SM) is another protocol which is being increasingly deployed in the Internet. PIM-SM builds shared trees which must be explicitly joined by downstream routers. All the sources in a group share the tree which is built around a central routing entity; i.e., a "core" or "Rendezvous Point (RP)." Every router that wants to join a particular multicast group must send an explicit Join to the RP for that group. This protocol is in contrast to broadcast-and-prune protocols discussed above, which broadcast multicast traffic downstream until explicit prunes are received. Further details of IP multicast, DVMRP, and PIM-SM can be found in publications such as: T. Maufer, "Deploying IP Multicast in the Enterprise," Prentice Hall, 1998; D. Waitzman, C. Partridge, and S. Deering, "Distance Vector Multicast Routing Protocol," RFC 1075, November 1988; and Estrin, D., Farinacci, D., Helmy, A., Thaler, D., Deering, S., Handley, M., Jacobson, V., Liu, C., Sharma, P., and L. Wei, "Protocol Independent Multicast-Sparse Mode (PIM-SM): Protocol Specification," RFC 2117, June 1997.

In mesh-TDMA satellite networks, the communication is usually point-to-point, and each transmit-receive pair of terminals is assigned one or more slots (bursts) in a frame for communication. Channel capacity is increased by adding carriers, and, in advanced TDMA schemes, terminals can hop carriers from burst-to-burst so as to maximize utilization of the space segment. Efficient multicasting in such an environment requires the identification of a slot/burst in which the closest terminal to a multicast source can transmit, and during which all receive terminals which are part of the group can listen. Finding such available slots can become a formidable problem which only worsens if group membership is dynamic.

The most straightforward technique for supporting multicast IP routing and forwarding in a mesh satellite network would be to incorporate multicast routing/forwarding capabilities into each terminal. A packet-switched satellite terminal typically has one or more terrestrial interfaces (such as X.25, frame-relay, ATM, or ethernet) and a single physical satellite interface. The satellite interface can be used to communicate with one, many, or all of the terminals in a network depending on the beam connectivity and available bandwidth on the satellite. Since multicast routing messages are typically exchanged between a router and all of its adjacent neighbors, the terminal/router would need to periodically communicate with all of the terminal/routers in the mesh, thereby using satellite link bandwidth. Supporting multicast routing protocols at the terminal can require significant CPU and memory resources. In the case of DVMRP, prune-state tables need to be maintained in all the terminals, which could potentially consume a lot of memory. In addition, significant effort may be required to port and test multicast routing protocol software, especially if multiple protocols were to be supported.

IP multicast has been reportedly deployed in hub-spoke type satellite networks, wherein satellite terminals communicate with a hub and not with each other. The hub broadcasts all its outbound data on a single carrier which is received by all terminals. Terminals demultiplex data intended for them and discard the rest. However, IP multicast has not been publicly deployed on mesh satellite networks.

SUMMARY OF THE INVENTION

It is, therefore, an object of the present invention to provide a bandwidth-efficient technique for routing multicast IP traffic over meshed satellite networks.

This and other objects are achieved by a system architecture wherein the multicast routing protocols are run in a centralized route server (implemented on a standard UNIX workstation). In this architecture, the satellite network is part of a router fabric, with terminals appearing as ports attached to the router core (the route-server). In the baseline implementation, external hosts/subnets connect to terminals through multicast enabled routers. External routers establish multicast routing sessions only with the route-server, and not with other terminals. Multicast routing packets originated by an external router attached to a terminal will be conveyed transparently to the route-server and used to create multicast group table information at the route server. This information is provided by the route-server to the terminals so that multicast traffic can be directly transmitted from the ingress terminal to all the terminals in a group, without having to be relayed through the route server.

Implementing the route-server on a workstation provides enough CPU and memory resources to run common routing protocols and store large routing tables. The route-server can be easily upgraded with more memory and extra processing power if necessary.

BRIEF DESCRIPTION OF THE DRAWINGS

The invention will be more clearly understood from the following description in conjunction with the accompanying drawing, wherein.

DETAILED DESCRIPTION OF THE INVENTION

Figure 1:
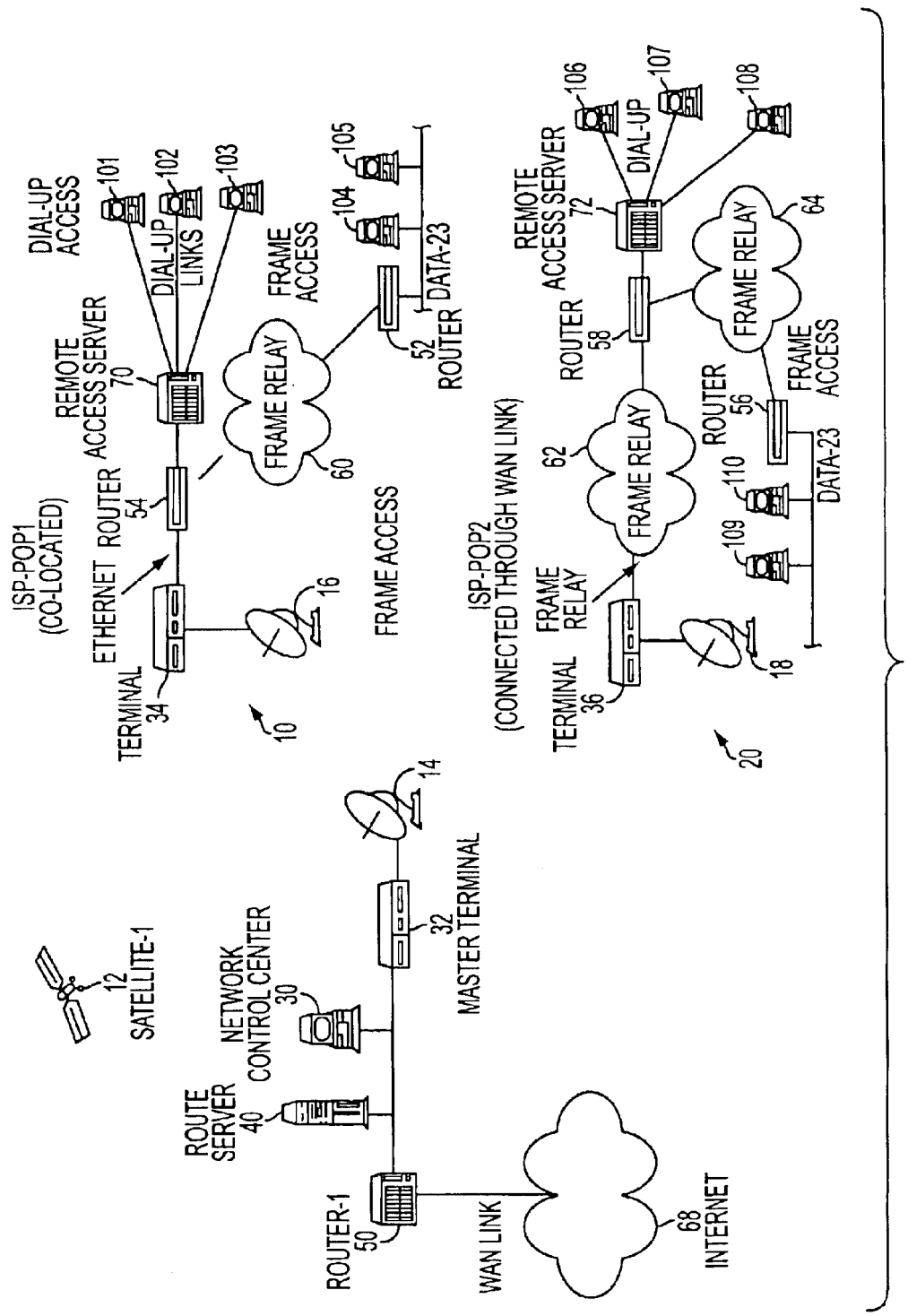
FIG. 1 is a diagram of a mesh satellite network supporting multicast IP services in accordance with the present invention.

An end-to-end network configuration which supports IP services over a mesh satellite network is shown in FIG. 1.

Such a network can be used to provide connectivity via satellite-1 12 and satellite dishes 14, 16, 18 to Internet Service Providers, e.g., 10 or 20, and can also be used to connect corporate sites. Routers 52, 54, 56 and 58 connect the terminals 34 and 36, possibly via frame relays 60, 62, 64 (or via an ethernet connection), to remote access servers 70, 72, and/or to various dial-up access units 101–110. The network control center (NCC) 30 is located at one site and it is typically a workstation which runs software responsible for configuring, controlling and monitoring the entire network of satellite terminals. The terminal 32 at that site is like any other terminal 34, 36 in the network, but is referred to as the master terminal for clarity. Such a network configuration is typical of most mesh satellite networks. An addition to the normal network configuration is the route-server (RS) 40, which can be connected by router-1 50 via a WAN link to the Internet 68. The RS computer is on the same Local Area Network (LAN) as the NCC 30 and the master terminal 32. It is assumed here that the beam connectivity is such that all terminals can communicate with each other directly (with a single satellite hop). However, straightforward extensions of the invention, such as the use of two route servers (one in each area), could handle the case of directional beam connectivity.

One approach to the problem of allocating point-to-multipoint (PTM) bursts is to set aside one or more slots in a TDMA frame (on one or more carriers) to be only used for broadcast communications. Terminals which need to transmit data in a PTM burst will request allocation of broadcast bursts from the NCC 30, and all terminals in the network will listen to the broadcast bursts. In case there are very few receiving terminals for a particular multicast, and if broadcast capacity is to be conserved, specific PTM slots could be found by a burst time plan (BTP) generation algorithm. In case broadcast slots are used up, and there is more demand, additional broadcast slots can be assigned by taking away capacity from point-to-point traffic. The minimum and maximum amounts of broadcast capacity to be made available would be pre-configurable by the network operator. If no broadcast or PTM capacity is available, then the terminal will replicate packets and transmit them over point-to-point bursts.

Figure 2:
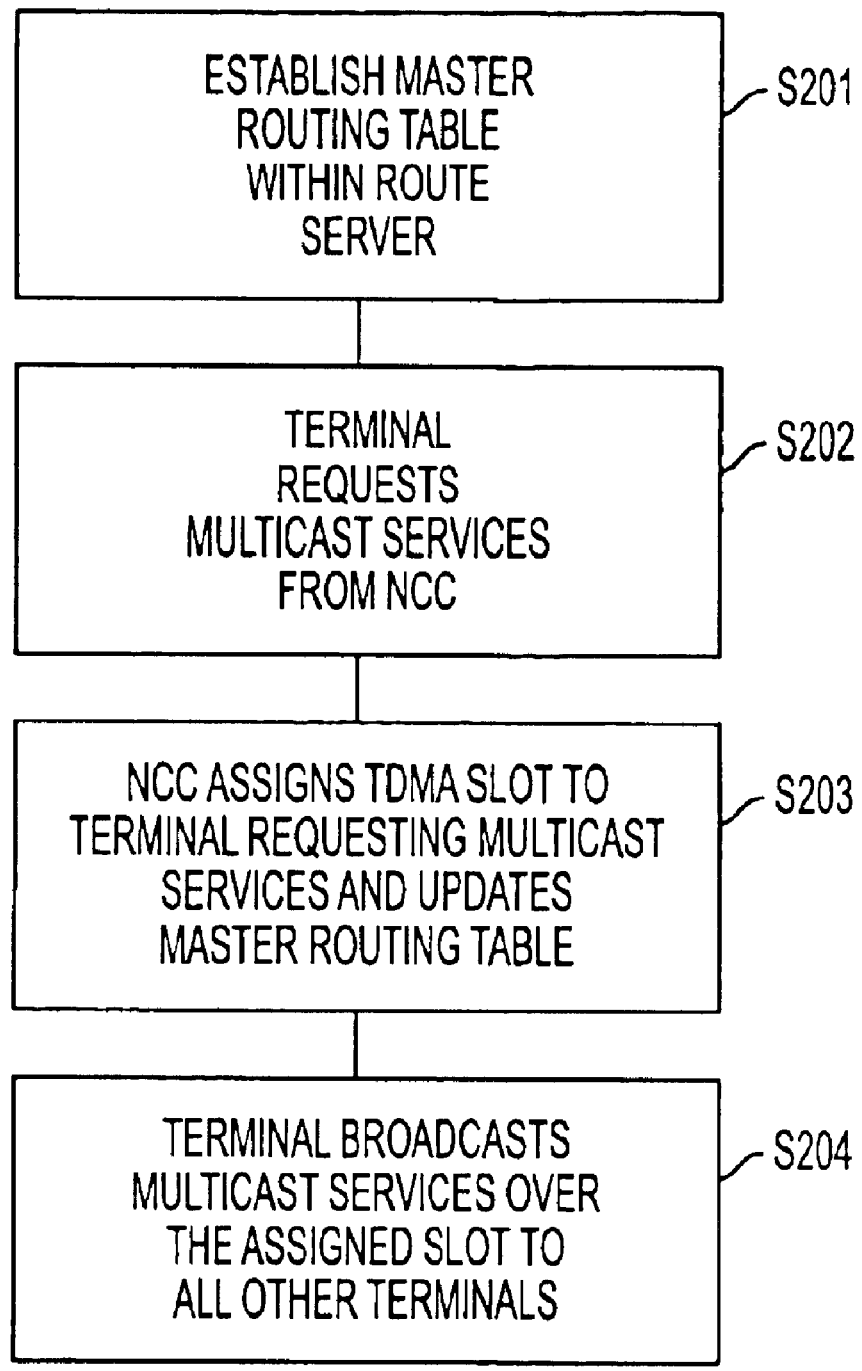
FIG. 2 is a flow chart illustrating the basic steps necessary to implement the invention.

A flowchart demonstrating the operation of the above-described configuration is shown in FIG. 2.

In step S201, a master routing table is established in the RS 40 by communication between the RS and other routers 52, 54, 56, 58. In step S202, a terminal 34 requests multicast services from the NCC 30. In step S203, the NCC 30 then assigns a TDMA slot for broadcast services for the use of the requesting terminal, and updates the master routing table accordingly. Then, in step S204, the multicast services are broadcast by the originating, or ingress, terminal 34 over the assigned slot, so that all terminals receive the transmitted message.

Figure 3:
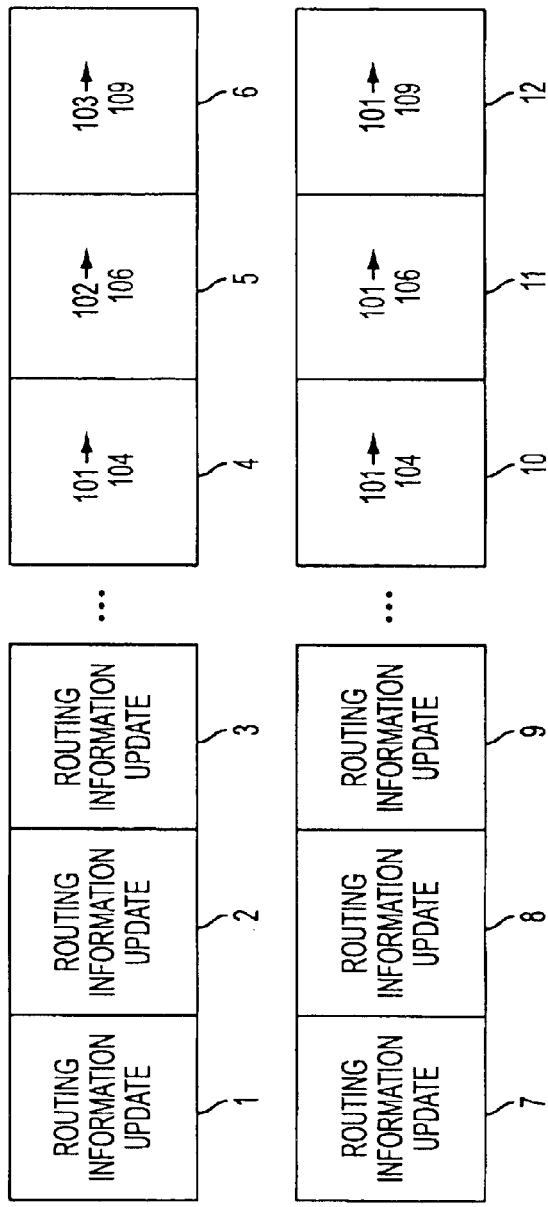
FIG. 3 is a representation of slot assignment in a prior art TDMA system.

FIG. 3 demonstrates a conceptualization of prior art TDMA slots for unicast and multicast services.

In slots 1–3, routing information is updated between the various routers so that slots 4–6 can each be assigned to communication between two points; e.g., between dial-up access units 101 to 104, 102 to 106 and 103 to 109. Such an arrangement is problematic because it requires an exchange of information between essentially all of the various routers, and this information must be updated periodically. This arrangement is even more problematic for multicast services, which also require an extensive exchange of information between routers (slots 7–9), because multiple slots (10–12) are needed for the multicast services; i.e., 101 to 104, 101 to 106 and 101 to 109.

Figure 4:
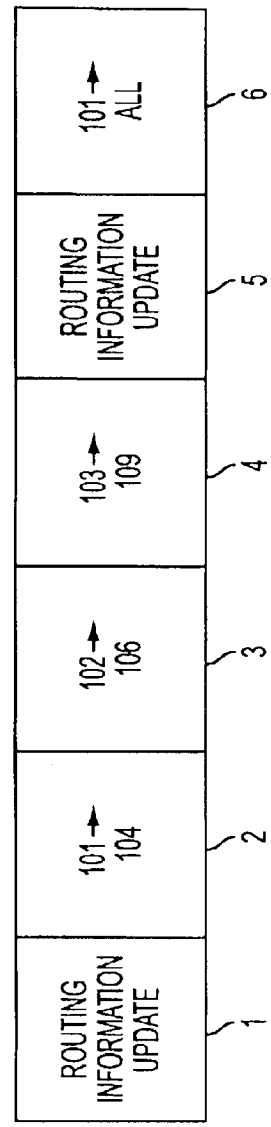
FIG. 4 is a representation of slot assignment according to the present invention.

In contrast, as shown in FIG. 4, the present invention allows for a reduction in the number of slots required for routing information updates (i.e., to slots 1 and 5). This reduction occurs due to the fact that routing information is exchanged only between each router and the RS 40, and not between all routers. In addition, the number of slots required for multicast services is drastically reduced (to only slot 6), because any one point in the network can broadcast to all other points over the broadcast time slot requested by a terminal and assigned by the NCC 30.

It should be noted that FIGS. 3 and 4 are not intended as exact descriptions of time slot allocation in either the prior art or the present invention. That is, it is not to be understood from FIG. 3 that exactly three time slots are required for routing information updates which will allow the communication described in slots 4–6 therein. Similarly, it is not to be understood that only one time slot is required for the present invention to update routing information in the RS 40 and/or assign the broadcast slot 6. Such information will depend on the number of routers present, bandwidth availability, etc. Instead, FIGS. 3 and 4 are intended to conceptually demonstrate that, by the use of a centralized route server and the assignment of a broadcast time slot for multicast services, link bandwidth can be effectively conserved, and delay can be significantly reduced.

Thus, in the proposed architecture, the RS 40 runs the multicast routing protocols, while the terminals 34, 36 actually short-cut the traffic to the appropriate destinations. The flows of multicast routing and multicast traffic are therefore different from that in a conventional network consisting of router-to-router links. The flow of routing-protocol and traffic packets in DVMRP and PIM-SM (the most commonly used multicast protocols) are analyzed as exemplary embodiments of the present invention, in order to show the additional processing required to support multicast within this architecture.

DVMRP

Figure 5:
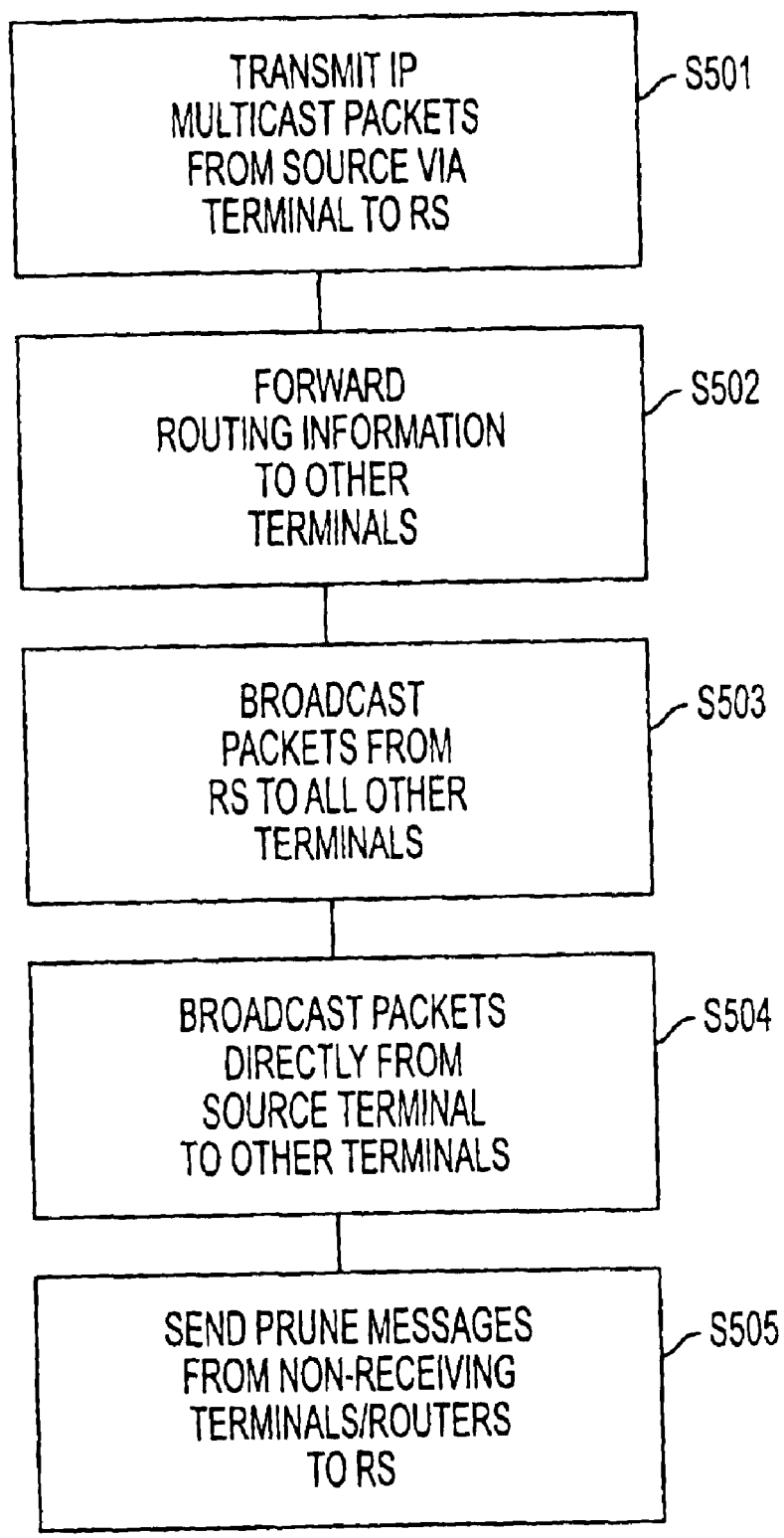
FIG. 5 is a flow chart illustrating the additional steps necessary to implement the present invention using the DVMRP routing protocol.

The various tasks which occur at the RS 40 and the terminals when multicast traffic and DVMRP routing packets are received are discussed in the context of the RS-based architecture and demonstrated in the flow chart of FIG. 5. The required steps demonstrated in FIG. 2 are not repeated in FIG. 5.

Multicast Traffic Enters a Terminal:

In step S501, assume that a source in a network attached to a terminal 34 is transmitting multicast packets. When these multicast packets reach the terminal 34, the Source Address and Group Address (referred to as (S,G)) is examined and a match is looked for in the multicast forwarding table in the terminal 34. If a match is not found, the packet is forwarded to the RS 40. In step S502, the RS 40 will receive the packet, check its forwarding table for the (S,G) pair, and if there is no match, it will create a new forwarding table entry for (S,G). The RS 40 will then send a message to update the multicast forwarding table of the ingress terminal 34 with the (S,G) table entry. Initially, in step S503, this entry will specify that (S,G) packets be sent to all other terminals using a broadcast burst. The RS 40 would also request the NCC 30 to allocate a broadcast burst to the ingress terminal 34. The RS 40 will then send a broadcast message to all other terminals to add an entry for (S,G) in their forwarding tables which would indicate that all (S,G) packets entering from the satellite interface would be sent out on the terrestrial interface(s). The RS 40 would finally broadcast the multicast packet (which triggered all the activity) to all other terminals.

Thereafter, in step S504, multicast packets will be forwarded directly on broadcast bursts by the ingress terminal 34. The case in which packets enter the master terminal 32 from the Internet (see FIG. 1) is covered in exactly the same manner. The master terminal 32 would be like any other ingress terminal.

Tree Pruning

In step S505, as DVMRP-Prunes are received at the RS 40 from external routers 52, 54, 56 and 58, the set of receiving terminals is refined. In one option, all terminals could continue sending packets to downstream routers which would drop packets depending on their prune state. Alternatively, to minimize downstream traffic, the RS 40 would send messages to terminals to prune their forwarding entries of the particular (S,G).

DVMRP Protocol Traffic

DVMRP routing table updates and probes will be exchanged between the RS 40 and external routers such as routers 52–58. External routers are assumed to connect to terminals with point-to-point links so that DVMRP routing messages will be sent using unicast. Each terminal connecting to the RS 40 connects on a different logical subnet. No modifications to DVMRP protocol software at the RS 40 would be necessary to accommodate these routing packets.

PIM-SM

Figure 6:
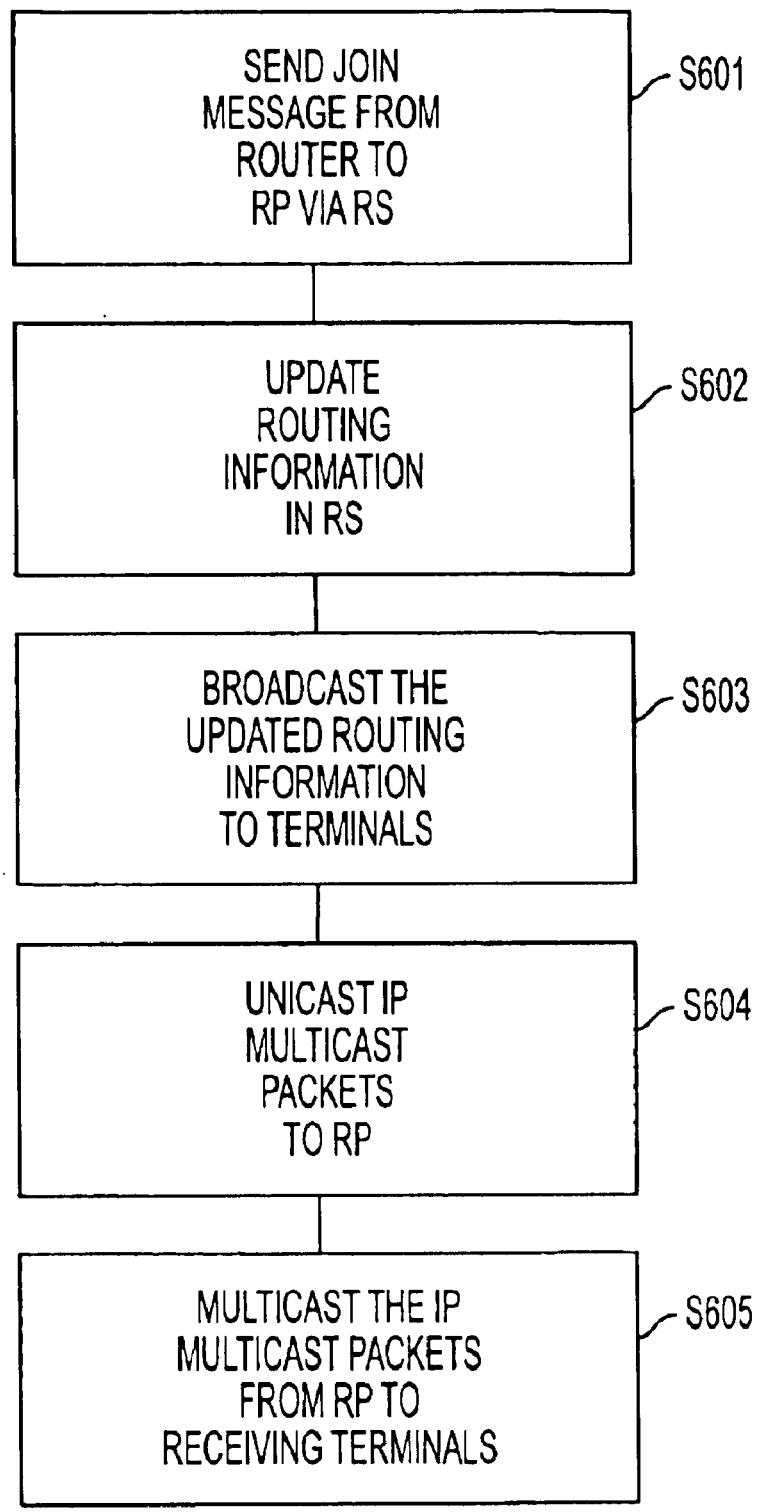
FIG. 6 is a flow chart illustrating the additional steps necessary to implement the present invention using the PIM-SM routing protocol.

The various tasks which occur in intermediate routers when group membership is requested and when multicast packets are originated in PIM-SM multicast networks are discussed in the context of the RS based architecture and demonstrated in the flow chart of FIG. 6.

Joining and Leaving a Group

In step S601, leaf routers 52 (which have hosts desiring multicast group membership) originate unicast PIM_JOIN messages which are sent upstream hop-by-hop to the rendezvous point (RP). Every upstream router 54 creates a forwarding entry for the (*,G) pair and sends the Join message to the next upstream router (if necessary). An external router attached to a terminal will therefore unicast PIM_JOIN messages to the RS 40 in step S602 if its routing table indicates that the RP can be reached through the satellite network. The PIM-SM software in the RS 40 will process the PIM_JOIN message in the normal fashion and will send it to the next upstream router (either attached to a terminal) or on the terrestrial side. As in the DVMRP case, the RS 40 will send a forwarding table update message to the upstream terminal 36 in step S603 indicating that the terminal should use broadcast or PTM bursts for multicast packets directed towards that particular multicast group. The RS 40 will also send a message to the terminal 34 which originated the Join message to add a forwarding entry for the (*,G) pair. Prune messages and switches to source specific shortest path trees will be handled in a similar manner.

Sending to a Group

When a source transmits multicast packets to a group, the attached router first encapsulates the packets in PIM-SM-Register packets and unicasts them to the group's RP in step S604. Based on the join messages that the RP gets, packets are then multicast to the appropriate hosts in step S605. As discussed above, PIM_JOIN messages from leaf routers 52 have already triggered the creation of appropriate multicast forwarding entries in the ingress and egress satellite terminals, therefore multicast packets entering a terminal will be transmitted appropriately.

In conclusion, a route server based architecture such as that discussed above can provide support for many multicast routing protocols in an elegant fashion. The use of short-cut forwarding at terminals will minimize delay and conserve bandwidth. The burst allocation scheme will intelligently allocate broadcast and point-to-multipoint bursts to multicast traffic so as to conserve bandwidth.

It will be appreciated that various changes and modifications may be made to the embodiments disclosed above without departing from the spirit and scope of the invention as defined in the appended claims.

What is claimed is:

1. A system for offing Internet Protocol (IP) multicast services in mesh TDMA satellite networks, said system comprising:

a plurality of terminals for providing said IP multicast services, each terminal being connected to at least one local router;

a route server in communication with a plurality of said local routers for establishing and maintaining routing information for said plurality of said local routers including routing information for repeated multicast calls through the network, based on updated information sent from individual said local routers; and a controller operative to allocate broadcast bursts to said terminals based on requests from said terminals via said route server.

2. A system according to claim 1, wherein said controller is operative to allocate said broadcast bursts through the selection of at least one slot in a TDMA frame to be used only for broadcast communication.

3. A system according to claim 1, wherein said IP multicast services are initiated between said terminals via said route server and said controller, and are thereafter maintained between said terminals.

4. A system according to claim 1, wherein said controller is operative to allocate said broadcast bursts in response to a request from one of said terminals, and thereafter all of said terminals listen to said broadcast bursts.

5. A system according to claim 4, wherein said controller is operative to allocate said broadcast bursts using an algorithm known as the Burst Time Plan (BTP) generation algorithm.

6. A system according to claim 4, wherein said controller allocates said broadcast bursts using point-to-point, multicast, or broadcast transmissions.

7. A system according to claim 4, wherein said controller dynamically allocates said broadcast bursts according to user demand for multicast services, and further wherein a maximum multicast capacity is preconfigured by a network operator.

8. A system according to claim 4, wherein said allocation occurs at least one of when the multicast transmission is setup, and after the multicast transmission is setup, based on changes in multicast traffic volume, as reported by terminals to said controller.

9. A system according to claim 1, wherein said terminals exchange routing information with said route server.

10. A system according to claim 9, wherein said terminals transmit and receive said broadcast bursts based on said routing information.

11. A system according to claim 10, wherein said routing information includes a multicast routing protocol which is run by said route server.

12. A system according to claim 11, wherein said multicast routing protocol is DVMRP.

13. A system according to claim 11, wherein said multicast routing protocol is PIM-SM.

14. A method for offering Internet Protocol (IP) multicast services in a mesh TDMA satellite network having a plurality of terminals connected to local routers, and a master terminal, said method comprising:

establishing and maintaining routing information for said plurality of local routers, in a common route server coupled to said master terminal, by exchanging information between each of said local routers and said common route server for repeated multicast calls through the network;

responding to a request for multicast services by assigning at least one slot in a TDMA frame to one of a plurality of terminals and updating said routing information in said common route server based on said assignment;

broadcasting said IP multicast services over said at least one slot according to said routing information in said common route server.

15. A method according to claim 14, further comprising:

transmitting IP multicast packets from a source to said route server;

forwarding said routing information to said terminals;

broadcasting said IP multicast packets from said route server to said terminals;

broadcasting said IP multicast packets between said terminals via said at least one slot;

refining a receiving set of said terminals, which receive said IP multicast packets, based on prune messages received at said route server from a non-receiving set of said terminals, which do not receive said IP multicast packets.

16. A method according to claim 14, further comprising:

sending join messages from a router to a rendezvous point (RP) via said route server;

updating said routing information in said route server based on said join messages;

broadcasting said updated routing information to said terminals;

unicasting IP multicast packets to said rendezvous point; and multicasting said IP multicast packets from said rendezvous point based on said updated routing information.

* * * * *